United States Patent [19]
Uchiyama

[11] Patent Number: 5,659,812
[45] Date of Patent: Aug. 19, 1997

[54] FOCUS DETECTION DEVICE AND METHOD

[75] Inventor: Shigeyuki Uchiyama, Tokyo, Japan

[73] Assignee: Nikon Corporation, Tokyo, Japan

[21] Appl. No.: 497,172

[22] Filed: Jun. 30, 1995

[30] Foreign Application Priority Data

Sep. 6, 1994 [JP] Japan .................. 6-212491

[51] Int. Cl.$^6$ .................................. G03B 3/00
[52] U.S. Cl. .......................... 396/104; 396/124
[58] Field of Search ................... 354/400–409; 396/104, 123, 124, 125

[56] References Cited

U.S. PATENT DOCUMENTS

| | | | |
|---|---|---|---|
| 5,001,507 | 3/1991 | Iida et al. | 354/402 |
| 5,051,767 | 9/1991 | Honma et al. | 354/406 |
| 5,068,682 | 11/1991 | Utagawa | 354/402 |
| 5,469,240 | 11/1995 | Uchiyama et al. | 354/406 |
| 5,481,329 | 1/1996 | Uchiyama et al. | 354/402 |
| 5,483,318 | 1/1996 | Hamada et al. | 354/402 |
| 5,485,002 | 1/1996 | Kusaka | 250/201.8 |
| 5,485,003 | 1/1996 | Kusaka | 250/201.8 |

FOREIGN PATENT DOCUMENTS 2-24617  1/1990  Japan .

*Primary Examiner*—Safet Metjahic
*Assistant Examiner*—Eric Nelson
*Attorney, Agent, or Firm*—Oliff & Berridge

[57] ABSTRACT

An optimum focus detection algorithm range is established in the focus detection area corresponding to the subject pattern. The method includes establishing a first region on the photoelectric conversion array; computing the contrast of the subject image in the first region based on the output signal strings of a plurality of photoelectric conversion elements contained in the first region; establishing a portion of the first region as a second region; and computing the contrast of the subject image in the second region based on the output signal strings of a plurality of photoelectric conversion elements contained in the second region. Subsequently, either the first region or the second region must be determined as the focus detection algorithm range based on the contrast of the first region and the contrast of second region. The focus adjustment condition of the shooting lens is computed based on the output signal strings of the first region or the second region, whichever is selected as the algorithm range.

15 Claims, 12 Drawing Sheets

FOCUS DETECTION DEVICE AND METHOD

BACKGROUND OF THE INVENTION AND METHOD

1. Field of the Invention

The present invention relates to a focus detection device used in cameras and in video equipment.

2. Description of Related Art

A focus detection device of a camera using a phase differential detection method is well known. FIG. 11 illustrates a focus detection device using a phase differential detection method. Light rays entering from region 101 in the shooting lens 100 pass through a field mask 200, a field lens 300, a stop aperture unit 401, and a re-imaging lens 501 and compose an image on an image sensor array A. The image sensor array is composed of a plurality of photoelectric conversion elements, arranged in a one-dimensional line, and produces an output corresponding to the light intensity. Similarly, light rays entering from region 102 in the shooting lens 100 pass through the field mask 200, the field lens 300, the stop aperture unit 402 and the re-imaging lens 502 and compose an image on the image sensor array B.

The two subject images thus composed on the image sensor arrays A, B, move away from each other during the so-called front focus condition in which the shooting lens 100 composes a clear image of the subject in front of the predetermined focus surface. Conversely, the images move toward each other during the so-called rear focus condition in which the shooting lens 100 composes a clear image of the subject in the back of the predetermined focus surface. The subject images on the image sensor arrays A, B, relatively coincide with each other during the so-called in-focus condition in which a clear image of the subject is composed on the predetermined focus surface. Therefore, focus adjustment of the shooting lens 100, in particular, and the amount and the direction of the deviation from the in-focus condition (hereafter simply defocus amount) in the present invention can be determined by obtaining the relative position shift of the pair of subject images as a result of the conversion of the pair of subject images into electric signals through photoelectric conversion using the signals produced by the image sensor arrays, and by algorithmic processing on these signals.

Thus, projected images from the re-imaging lenses 501 and 502 in the image sensor arrays A, B, coincide with each other in the vicinity of the predetermined focus surface, which, in general, is the central region in the shooting field as illustrated in FIG. 15. This region is designated as a focus detection area.

Here, the algorithm processing method for obtaining the defocus amount will be described.

Each of the image sensor arrays A, B, is composed of a plurality of photoelectric conversion elements and outputs a plurality of output signal strings $a[1], \ldots a[n]$ and $b[1], \ldots b[n]$ (see FIG. 13 (a), (b)). Subsequently, the image sensor arrays perform the correlation algorithm while relatively shifting the data within a specified range of the pair of output signal strings by a predetermined data amount L. Letting the maximum shift amount be 1 max, the range of L becomes −1 max to 1 max. Specifically, the correlation amount C[L] is computed using formula 1.

$$C[L] = \Sigma |a[i+L] - b[i]| \tag{1}$$

$L = -1\ \text{max}, \ldots -2, -1, 0, 1, 2, \ldots 1\ \text{max}$ where $\Sigma$ denotes the total sum over $i = k \rightarrow r$.

In formula 1, L is an integer corresponding to the shift amount of the data strings as described above. The first term k and the last term r vary depending on the shift amount L as described formulae 2.

If $L \geq 0, \ldots k = k0 + INT\{-L/2\}$ $r = r0 + INT\{-L/2\}$

If $L < 0, k = k0 + INT\{-(L+1)/2\}$ $r = r0 + INT\{-(L+1)/2\}, \tag{2}$ where k0 and r0 denote the first term and the last term, respectively, when the shift amount L is equal to 0.

FIG. 14 illustrates a combination of signals for computing the absolute value of the difference between array A signals and array B signals in formula 1 and the algorithm range resulting from adding the absolute values of these differences when the initial term k and the last term r are varied by formulae 2. As illustrated in the figure, the ranges used in the correlation algorithm of row A and row B shift away from each other with the change in the shift amount L. In a method in which the first term k and the last term r are fixed regardless of the shift amount L, the range used in the correlation algorithm of one of the rows is held constant, and only the other row shifts. In this case, the shift amount of the relative position becomes the shift amount L when a pair of data coincides. Therefore, the shift amount making the correlation amount a relative minimum among the correlation amounts C[L] thus obtained is detected. This shift amount is multiplied by a constant determined by the pitch width of the photoelectric conversion elements in the image sensor array and the optical system described in FIG. 11 to become the defocus amount. Thus, a large defocus amount can be detected by making the maximum shift value 1 max larger.

Here, the correlation amount C[L] is discrete, as illustrated in FIG. 13(c), and the minimum unit of detectable defocus amount is limited by the pitch width of the photoelectric conversion elements in the image sensor arrays A, B. A method in which precise focus detection is obtained by performing the interpolation algorithm based on the discrete correlation amount C[L] resulting in a new, true relative minimum Cex is disclosed by the applicant of the present invention in U.S. Pat. No. 4,561,749. In this method, a true relative minimum Cex and a shift amount Ls producing Cex are computed by formulae 3 and formula 4 using a relative minimum correlation amount C[1] and correlation amounts C[1+1] and C[1−1] with shift amounts on both sides of C[1], as illustrated in FIG. 12.

$$DL = (C[1-1] - C[1+1])/2 \quad Cex = C[1] - |DL| \tag{3}$$

$$E = MAX\{C[1+1] - C[1], C[1-1] - C[1]\}$$

$$Ls = 1 + DL/E \tag{4}$$

In formulae 3, MAX{Ca, Cb} is the larger of Ca and Cb. Finally, the defocus amount DF is computed from the shift amount Ls using formula 5.

$$DF = Kf \times Ls \quad (5)$$

Kf in formula 5 is a constant determined by the photoelectric conversion elements in the optical system and in the image sensor array in FIG. 11.

For the defocus amount thus obtained, a determination must be made regarding whether it is a true defocus amount or whether it is caused by a fluctuation of correlation amounts due to noise and the like. If the defocus amount satisfies the conditions of formula 6, it is considered reliable.

$$E > E1 \text{ and } Cex/E < G1 \quad (6)$$

E1 and G1 in formula 6 are predetermined threshold values. Value E quantifies changes in the correlation amount that depend on the contrast of the subject, and, as the value of E becomes larger, the contrast becomes larger and the confidence level becomes higher. Cex is the difference between the pair of data when the data are closest to each other. Ideally, Cex should be 0. However, due to noise and the visual difference between region 101 and region 102, there is a minute difference between the pair of subject images; hence, Cex is never 0 in reality. As the contrast of the subject becomes higher, the effect of noise and the difference in subject images becomes smaller. Therefore, Cex/E is used to denote the level of coincidence of the pair of data. Naturally, as the value of Cex/E becomes closer to 0, the level of the coincidence of the pair of data and the level of confidence becomes higher.

In another method, the contrast for one of the pair of data is computed and used instead of the value E to determine confidence. If the system is determined reliable, driving or display of the shooting lens 100 is executed based on the defocus amount DF. The correlation algorithm, the interpolation algorithm and the determination of conditions associated with formula 1 through formula 6, above, will be referred to together as the focus detection algorithm.

In the above-stated description of the focus detection algorithm, the output signals from the image sensor array are used without modification. However, a method in which filter processing is executed on the output signals to compute the filter processing data, and the focus detection algorithm is performed using the filter processing data, is disclosed in Japanese Laid-Open Patent Publication Sho 61-245123.

If the shooting lens 100 is in the focus condition, the focus detection device is structured in general such that a pair of data coincide when the shift amount L is approximately 0. Therefore, the shooting lens 100 cannot focus on a subject unless the subject image is not formed in the range from the first term k0 through the last term r0 of the image sensor arrays A, B. Thus, the region in which focus detection is performed is determined by the first term k0 and the last term r0. Assuming, for example, that the first term k0 and the last term r0 are part of the central section of the image sensor array, the region in which focus detection is performed becomes the region described by the real line in the central section of the shooting field. Hereinafter, the data range from the first term k0 through the last term r0 will be called the algorithm range. Moreover, the region corresponding to the algorithm range on the shooting field is the focus detection area, and the photographer is able to focus the shooting lens on a desired subject by catching the subject within the focus detection area.

In the focus detection device described above, the optimum algorithm range varies with the subject pattern. This problem will be described with reference to FIGS. 7, 8 and 9. These figures show one of the output signals in the pair of image sensor arrays.

In comparing the wide algorithm range ce1 and the narrow algorithm range ce2 when the subject pattern consists only of low frequency components, as illustrated in FIG. 7, the wide algorithm range ce1 is found to have more contrasts contained in the algorithm range than the narrow range ce2. Thus, the value E for the wide algorithm range ce1 obtained by the focus detection algorithms using formulae 1 through 6 becomes larger, resulting in the focus detection in the algorithm range ce1 having a higher confidence level.

Moreover, in comparing the wide algorithm range ce1 and the narrow algorithm range ce2 when the subject pattern contains high frequency components with contrasts existing locally, as illustrated in FIG. 8, the contrasts contained in the algorithm range are the same for both algorithm ranges. Thus, the values E obtained by the focus detection algorithms using formulae 1 through 6 are equal for both algorithm ranges. However, the effects of noise and the like are larger on the wider algorithm range; thus, the value Cex becomes smaller for the narrower algorithm range, resulting in the focus detection in the algorithm range ce2 having a higher confidence level.

Moreover, in comparing the wide algorithm range ce1 and the narrow algorithm range ce2 when the subject pattern contains high frequency components and a fine pattern spreads throughout the subject, as described in FIG. 9, the wide algorithm range ce1 is found to have more contrasts contained in the algorithm range than the narrow range ce2. Thus, the value E for the wide algorithm range ce1 obtained by the focus detection algorithms using formulae 1 through 6 becomes larger, resulting in the focus detection in algorithm range ce1 having a higher confidence level.

In order to overcome the problem that the optimum algorithm range varies with the subject pattern, a method of focus detection in which the frequency component contained in the subject pattern is detected and the algorithm range is made narrower if a high frequency component is found, while the algorithm range is made wider if no high frequency component is found, is disclosed by the applicant of the present invention in Japanese Laid-Open Patent Publication Hei 4-211213. In this method, the optimum algorithm range is selected in the cases of FIG. 7 and FIG. 8. However, the method is ineffective in a situation in which a high frequency component is contained and the wide algorithm range is desired.

Moreover, the position of the pattern is shifted, as shown in FIG. 8, the output signal becomes similar to the signal shown in FIG. 10 and contrasts disappear from the narrow algorithm range ce2, thus making it impossible to obtain focus detection results with a high confidence level.

SUMMARY OF THE INVENTION

The present invention provides a focus detection device that establishes the optimum focus detection algorithm range in the focus detection area corresponding to the subject pattern.

In order to achieve the objective described above, the focus detection device of the present invention establishes a first region on the photoelectric conversion element array and computes the contrast of the subject image in the first region based on the output signal strings from the plurality of photoelectric conversion elements contained in the first region.

The focus state detection device then establishes a portion of the first region as a second region and computes the contrast of the subject image in the second region based on the output signal strings from the plurality of photoelectric conversion elements contained in the second region. The device then selects either the first region or the second region as the focus detection algorithm range based on the first region contrast and the second region contrast. The device is able to compute the focus adjustment condition of the shooting lens based on the output signal strings from the selected first or second region.

In another aspect of the invention, the focus detection device generates filter processing signal strings by filter processing the output signal strings from the photoelectric conversion element array. Moreover, the device establishes the first region on the photoelectric conversion element array and computes the contrast of the subject image in the first region based on the filter processing signal strings corresponding to the plurality of photoelectric conversion elements contained in the first region.

The device then establishes a portion of the first region as the second region and computes the contrast of the subject image in the second region based on the filter processing signal strings corresponding to the plurality of photoelectric conversion elements contained in the second region. The first region or the second region is then selected as the focus detection algorithm range, based on the first region contrast and the second region contrast. The focus adjustment condition of the shooting lens can be computed based on the filter processing signal strings from the region selected as the algorithm range.

In another aspect of the invention, the location of the center of the contrast distribution of the first region is computed, and a second region having a specified width from the location of the center of the distribution is established.

In yet another aspect of the present invention, the location where the absolute value of the difference between the adjacent signals, or between signals having a specified distance from each other within the filter processing signal strings or within the output signal strings corresponding to the first region, becomes the maximum is computed. A second region having a specified width from the location where the absolute value becomes the maximum is established.

In still another aspect of the present invention, the contrast of the first region and the contrast of the second region are compared, and the second region is selected as the algorithm range if the difference between the two contrasts is smaller than or equal to the specified value, and the first region is determined as the algorithm range if the difference between the two contrasts is larger than the specified value.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

Figure 1:
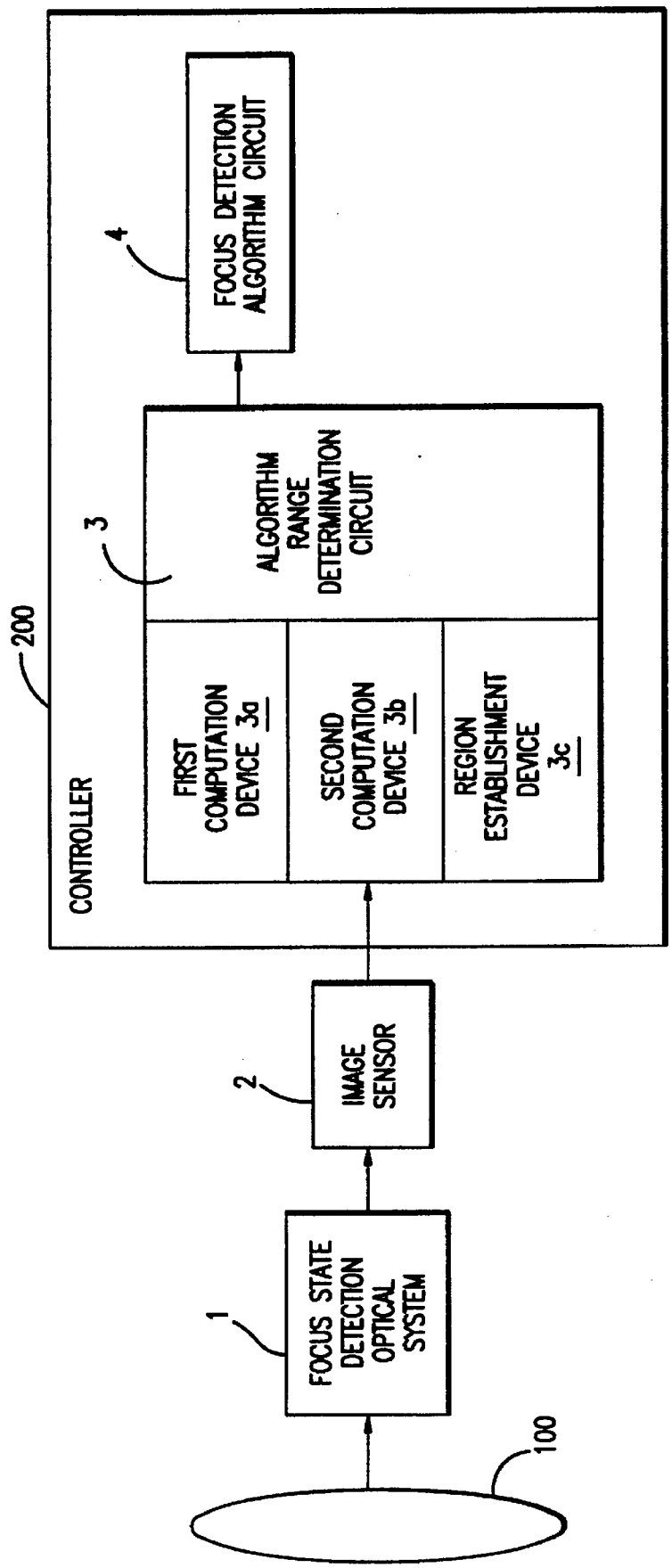
FIG. 1 is a block diagram illustrating the structure of a first embodiment.

FIG. 1 is a functional block diagram describing the structure of a first embodiment.

The focus detection optical system 1 is an optical system that guides light passing from the subject through the shooting lens 100 to an image sensor 2 and comprises a field mask 200, a field lens 300, stop aperture units 401, 402 and re-imaging lenses 501, 502, for example.

The image sensor 2 consists of a pair of image sensor arrays A, B, each of which includes, for example, 52 photoelectric conversion elements, and each of which outputs the output signal strings a[i] and b[i] consisting of 52 pieces of data.

The algorithm range determination circuit 3 determines the focus detection algorithm range based on the output signal strings a[i] and b[i] from the image sensor 2. The algorithm range determination circuit 3 compares the contrast in the wide standard region established on the image sensor arrays A, B and the contrast in the narrow second region formed around the section with strong contrast within the standard region. The determination circuit then selects either the standard region or the second region as the focus detection algorithm region based on the result of the comparison. The algorithm range determination method will be explained in detail later.

The focus detection algorithm circuit 4 detects the focus adjustment condition of the shooting lens 100 by performing the focus detection algorithm of formulae 1 through 6 based on the output signal strings from the output signal strings a[i] and b[i] from the image sensor 2 corresponding to the algorithm range determined by the algorithm range determination circuit 3.

In the illustrated embodiments, the controller 200 is implemented as a single special purpose integrated circuit (e.g., ASIC) having a main or central processor section for overall, system-level control, and separate circuits dedicated to performing various different specific computations, functions and other processes under control of the central processor section. It will be appreciated by those skilled in the art that the controller can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The controller can also be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIGS. 2, 3, 5 and 6 can be used as the controller. As shown, a distributed processing architecture is preferred for maximum data/signal processing capability and speed.

Figure 2:
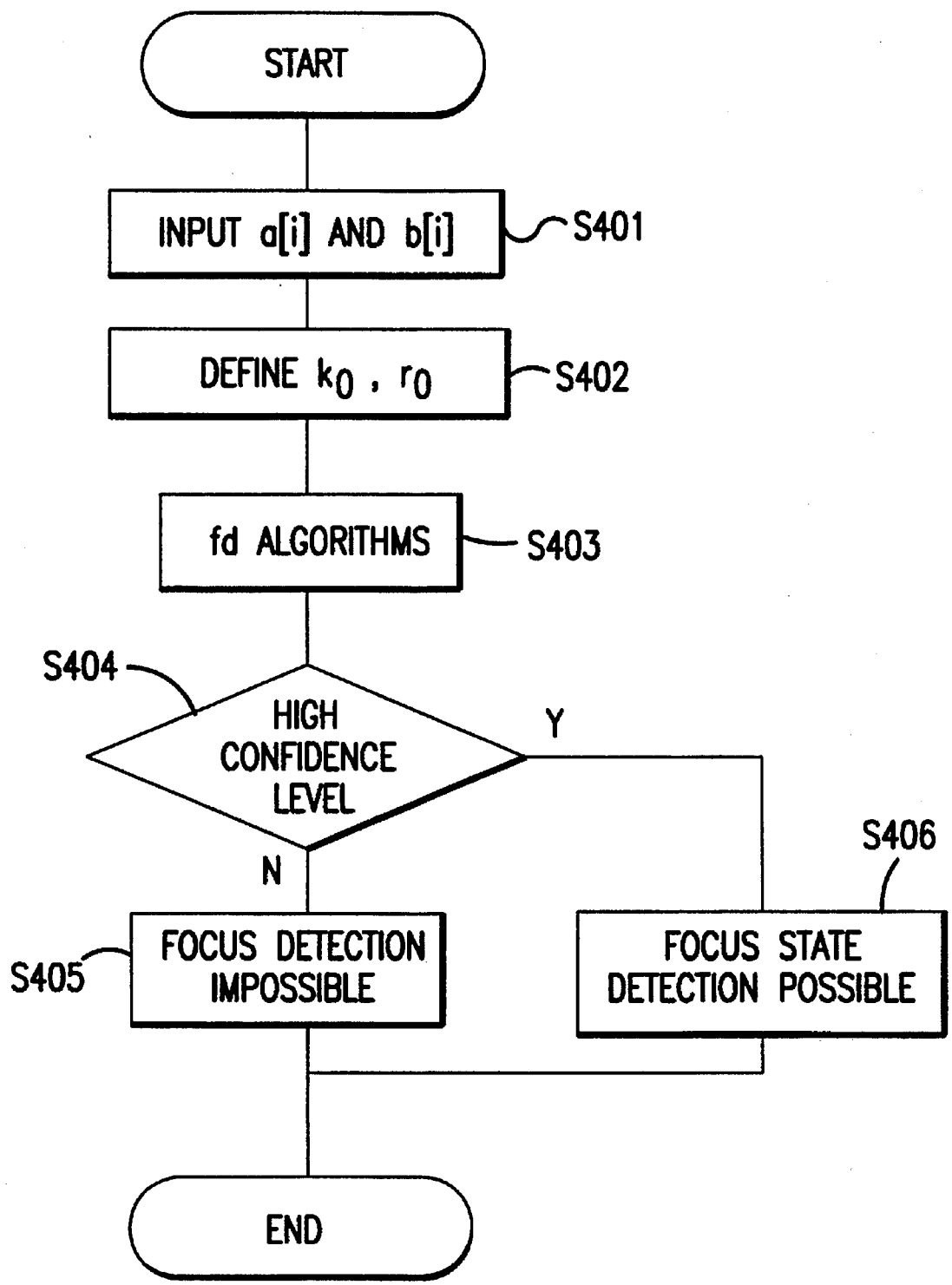
FIG. 2 is a flow chart illustrating the focus detection operation of the first embodiment.

The focus detection operation of the embodiment structured in the above manner will be explained with reference to FIG. 2.

At step S401, the algorithm range determination circuit 3 inputs the output signal strings a[i] and b[i] from the image sensor 2. At step S402, the algorithm range determination circuit 3 determines the algorithm range by defining the first term k0 and the last term r0. A detailed explanation of this determination method is provided below.

At step S403, the focus detection algorithms of formulae 1 through 6 are performed based on the output data a[i] and b[i] corresponding to the algorithm range. At step S404, the focus detection algorithm circuit determines whether a defocus amount with a high confidence level is obtained. If a defocus amount with a high confidence level is obtained, the operation is completed at step S406 in which focus detection is indicated as possible. Alternatively, if the defocus amount does not have the desired level of confidence, the process moves to step 405 where the operation is completed and focus detection is indicated as impossible. These steps, S403 through S406, are operations of the focus detection algorithm circuit 4.

Figure 3:
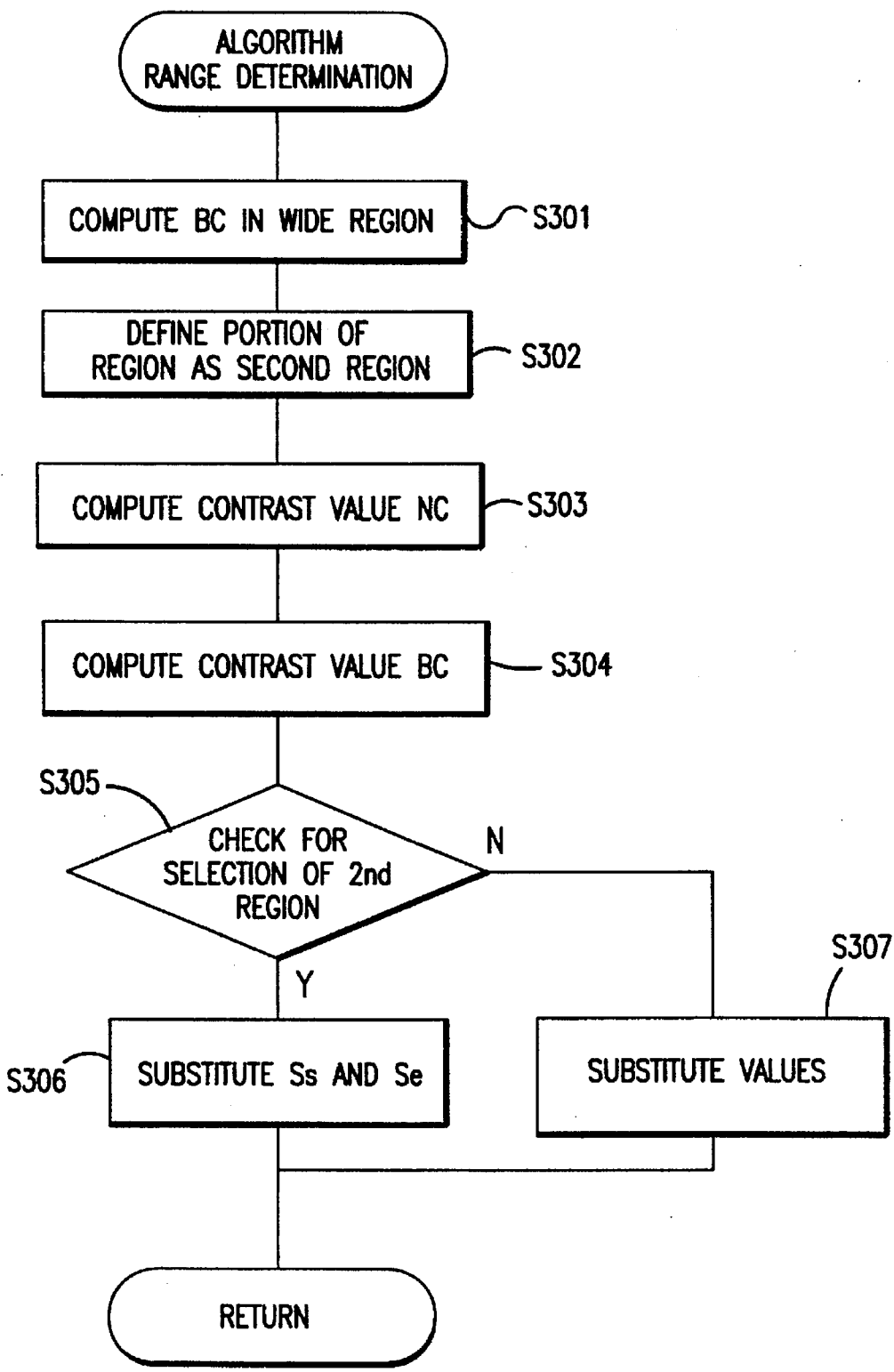
FIG. 3 is a flow chart illustrating the algorithm range determination method of an embodiment of the present invention.

The operation of the algorithm range determination circuit 3 at step S402 in FIG. 2 will be described with reference to FIG. 3.

At step S301, the contrast value BC in the wide standard region is computed. Here, the output signal strings a[i] of array A are used, and the standard region contains 36 photoelectric conversion elements from the central section of the 52 photoelectric conversion elements. The contrast value BC is obtained from formula 7.

$$BC = \Sigma |a[i] - a[i+t]|, \ldots \tag{7}$$

where $\Sigma$ denotes the total sum over i=9 to 44−t, and t is an integer, preferably around 1 to 4 in this case.

In this algorithm, if the absolute value of the difference is less than or equal to the specified value, the absolute value of the difference should be replaced by 0 to eliminate the effects of noise.

At step S302, a portion of the standard region is defined as the second region. Establishment of the second region is based on the contrast distribution of the standard region. The following two methods are examples of methods that can be used to establish the second region.

In the first method, the center of the contrast distribution in the standard region is computed, and the region having a specified width around the location of the center Js is defined as the second region. The location of the center Js is obtained by formula 8.

$$Js = \Sigma(|a[i]-a[i+t]| \times i) / \Sigma(|a[i]-a[i+t]|), \tag{8}$$

where $\Sigma$ denotes the total sum over i=9 to 44−t, and t is the same as in formula 7.

Js is made into an integer by truncation or by rounding off, and the second region is defined as width 12 data, for example, so that it is centered at Js. If t is 1, for example, the range from Js to Js+1 becomes the center of the second region, and the leading data number Ss and the last data number Se of the second region are determined by formulae 9.

$$Ss = Js - 5, \ldots$$

$$Se = Js + 6 \tag{9}$$

In the second method, a section Mc, the area where the absolute value of the difference between adjacent data, or between data that are apart from each other by a specified data amount, becomes the maximum is detected. The second region is established as the region including a specified width from the maximum section Mc. The maximum section Mc is obtained by formula 10.

$$Mc = Max(|a[i]-a[i+t]|), \tag{10}$$

where Max denotes the largest value of $|a[i]-a[i+t]|$ over i=9 to 44−t.

The second region is defined as width 12 data to center the computed maximum section Mc. If t is 1, for example, the range from Mc to Mc+1 becomes the center of the second region, and the leading data number Ss and the last data number Se of the second region are determined by formulae 11.

$$Ss = Mc - 5,$$

$$Se = Mc + 6 \tag{11}$$

At step S303, the contrast value NC of the second region established in the steps above will be computed using formula 12.

$$NC = \Sigma |a[i]-a[i+t]|, \tag{12}$$

where $\Sigma$ denotes the total sum over i=Ss to Se−t, and t is the same as in formula 7.

In this step, if the absolute value of the difference is less than or equal to the specified value, the absolute value of the difference should be replaced by 0 to eliminate the effects of noise.

At step S304, the contrast value BC for the standard region and the contrast value NC for the second region are compared, and one of the two regions will be determined as the focus detection algorithm range. The determination method is as follows: if both values are almost equal to each other, the second region is established as the algorithm region, while if the difference between the two values is large, the standard region is established as the algorithm range. In particular, the second region is selected if the condition specified by formula 13 is satisfied. Otherwise the standard region is selected.

$$BC < Ks \times NC, \tag{13}$$

where Ks is a real number, preferably between 1 and 2.

At step S305, selection of the second region is checked. If the second region is selected, the algorithm range determination circuit moves to S306, while it moves to step S307 if the standard region is selected. If the second region is selected, the process is completed by substituting the following values for the first term k0 and the last term r0 at step S306.

$$k0=Ss,$$

$$r0=Se. \qquad (14)$$

Alternatively, if the standard region is selected, the process is completed by substituting the following values for the first term k0 and the last term r0 at step S307.

$$k0=9,$$

$$r0=44. \qquad (15)$$

In the second embodiment, the filter processing data are computed in place of using output signals from the image sensor directly. Algorithm range determination and the focus detection algorithm are executed using these filter processing data. Filter processing is disclosed in Japanese Laid-Open Patent Publication Sho 61-245123 among others; hence, explanation will be omitted here.

Figure 4:
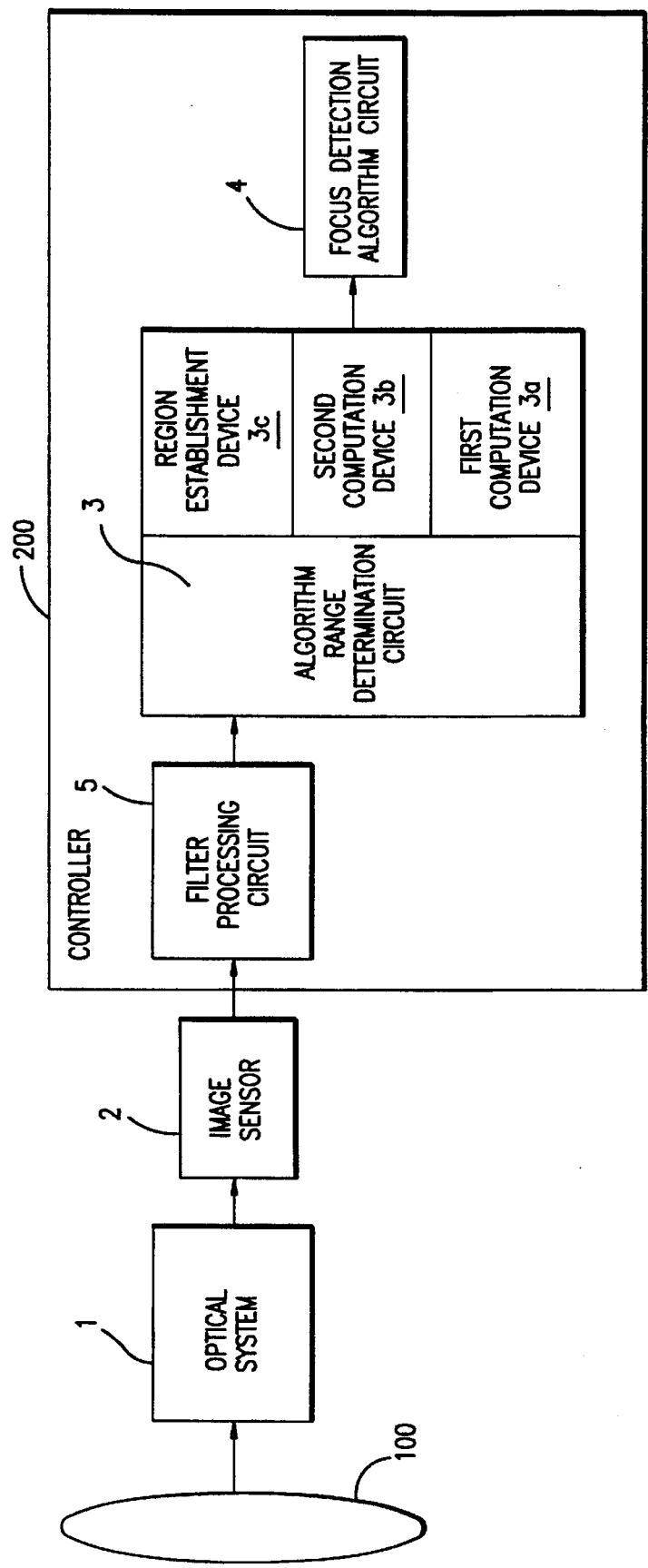
FIG. 4 is block diagram illustrating the structure of a second embodiment.

FIG. 4 is a functional block diagram illustrating the structure of a second embodiment.

The focus detection optical system 1 is an optical system that guides light from the subject through the shooting lens 100 to an image sensor 2. The optical system comprises a field mask 200, a field lens 300, stop aperture units 401, 402, and re-imaging lenses 501 and 502, for example.

The image sensor 2 consists of a pair of image sensor arrays A, B, each of which comprises, for example, 52 photoelectric conversion elements, and each of which outputs the output signal strings a[i] and b[i] consisting of 52 pieces of data.

The filter processing circuit 5 performs filter processing on the output signal strings a[i] and b[i] and outputs the filter processing data Fa[i] and Fb[i]. For filter processing, a high frequency eliminating filter is described by formulae 16 and the DC eliminating filter is described by formulae 17.

$$Fa[i]=(a[i]+2\times a[i+1]+a[i+2])/4$$

$$Fb[i]=(b[i]+2\times b[i+1]+b[i+2])/4, \qquad (16)$$

where i=1 to 50

$$Fa[i]=-a[i]+2\times a[i+s]-a[i+2s]$$

$$Fb[i]=-b[i]+2\times b[i+s]-b[i+2s], \qquad (17)$$

where l=1 to 52−2s.

In the filter processing circuit 5, one of the two filter processes of formulae 16 and formulae 17 can be executed, but it is preferable to execute the high frequency eliminating first using formulae 18, then to further execute DC eliminating processing using formulae 19 on the data Pa[i] and Pb[i] for which the high frequency eliminating has already been performed.

$$Pa[i]=(a[i]+2\times a[i+1]+a[i+2])/4$$

$$Pb[i]=(b[i]+2\times b[i+1]+b[i+2])/4, \qquad (18)$$

where i=1 to 50.

$$Fa[i]=-Pa[i]+2\times Pa[i+s]-Pa[i+2s]$$

$$Fb[i]=-Pb[i]+2\times Pb[i+s]-Pb[i+2s], \qquad (19)$$

where l=1 to 50−2s.

In formulae 17 and 19, s represents integers from 1 to about 10. As s becomes larger, the frequency component of the subject pattern extracted becomes lower; as s becomes smaller, the frequency of the subject pattern extracted becomes higher.

Since the frequency components contained differ by their subject patterns, filter processing is performed to extract the high frequency components by setting s=2 initially. If a defocus amount with a high level of confidence is obtained by the focus detection algorithm circuit 4, the algorithm is completed. Otherwise, filter processing is performed to extract the low frequency components by setting s=4, and the focus detection algorithm is executed again by the focus detection algorithm circuit 4.

The algorithm range determination circuit 3 determines the algorithm range based on the filter processing data Fa[i] and Fb[i] outputted from the filter processing circuit 5. The filter processing circuit 5 outputs filter processing data from which high frequency components are extracted with s=2. The algorithm range determination circuit 3 compares the contrast in the wide standard region established on the image sensor arrays A, B, and the contrast in the narrow second region formed around the section with strong contrast within the standard region. The range determination circuit then determines either the standard region or the second region as the focus detection algorithm range based on the result of the comparison. Moreover, if the filter processing circuit 5 outputs filter processing data from which low frequency components are extracted with s=4, a predetermined wide algorithm range is established. The determination method of these algorithm ranges will be explained below in greater detail.

The focus detection algorithm circuit 4 detects the focus adjustment condition of the shooting lens 100 by performing the focus detection algorithm of formulae 1 through 6 based on the filter processing data within the filter processing data Fa[i] and Fb[i] outputted from the filter processing circuit 5 corresponding to the algorithm range determined by the algorithm range determination circuit 3.

Figure 5:
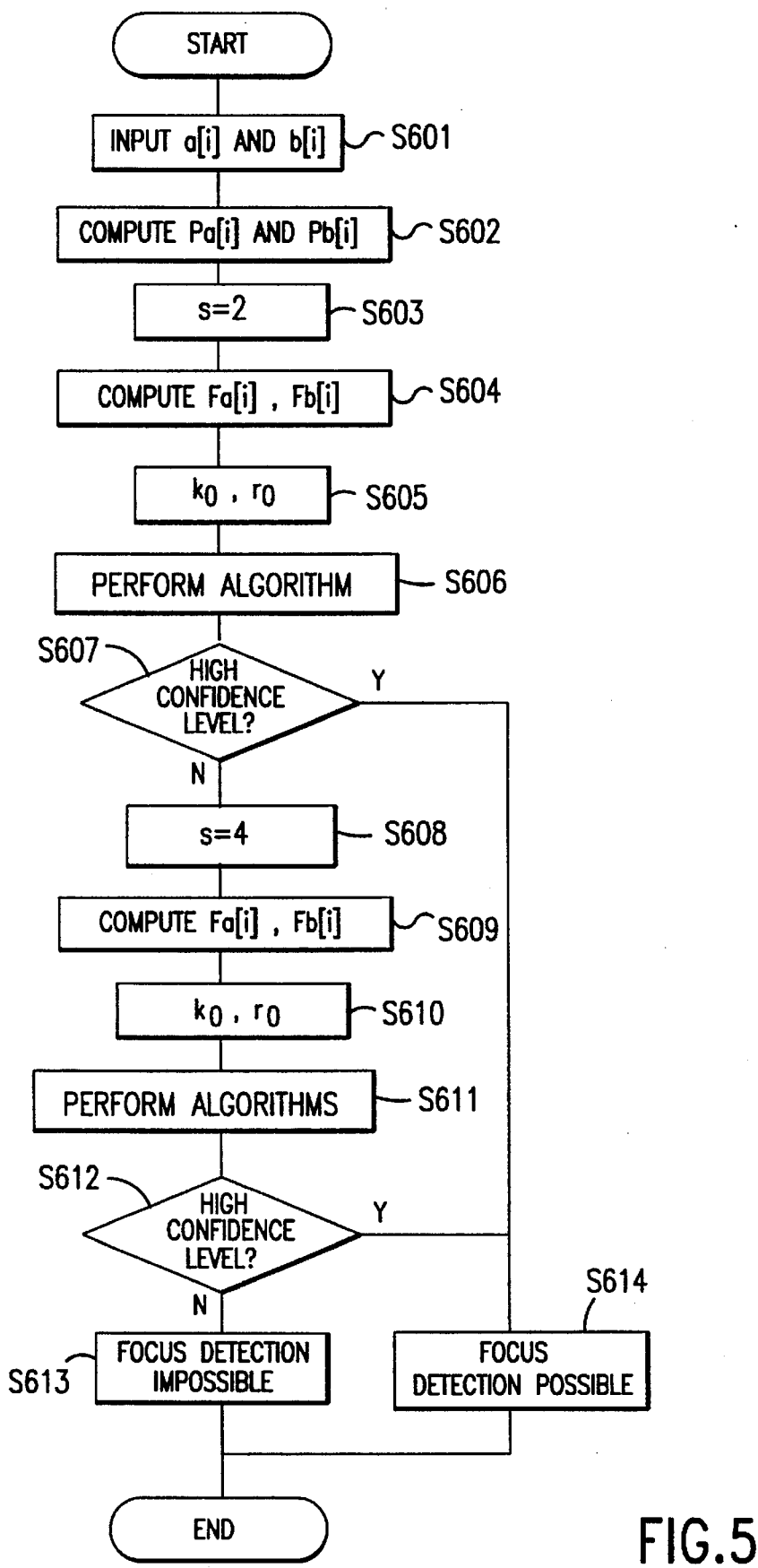
FIG. 5 is a flow chart illustrating the focus detection operation of the second embodiment.

Hereinafter, the focus detection operation of the second embodiment structured in the above manner will be described in reference to FIG. 5. At step S601, the filter processing circuit 5 inputs the output signal strings a[i] and b[i] from the image sensor 2. At step S602, the filter processing data Pa[i] and Pb[i] are computed by formulae 18. At step 603, the value of s in formulae 19 is set to 2, and the filter processing circuit 5 moves to step S604 to compute the filter processing data Fa[i] and Fb[i] by performing the filter processing algorithm of formulae 19. These steps, S602 through S604, are the operation of the filter processing circuit 5. At step S605, the algorithm range determination circuit 3 determines the first term k0 and the last term r0 and establishes the focus detection algorithm range, the details of which will be presented later. At step S606, the focus detection algorithms of formulae 1 through 6 are performed based on the data within the filter processing data Fa[i] and Fb[i] corresponding to the algorithm range. At step S607, the focus detection algorithm circuit 4 determines whether a defocus amount with a high confidence level is obtained. If a defocus amount with a high confidence level is obtained, the operation is completed and focus detection is possible. These steps, S606 and S607, are operations of the focus detection algorithm circuit 4. Alternatively, if the defocus amount does not have the desired confidence level, the focus detection algorithm circuit moves to step S608.

At step S608, the value of s in formulae 19 is set to 4, and the process moves to step S609 to compute the filter processing data Fa[i] and Fb[i] by performing the filter processing algorithm of formulae 19. These steps, S608 and S609, are the operation of the filter processing circuit 5. At step S610, the algorithm range determination circuit 3 determines the first term k0 and the last term r0 and establishes the focus detection algorithm range in the manner described below. At step S611, the focus detection algorithms of formulae 1 through 6 are performed based on the data within the filter processing data Fa[i] and Fb[i] corresponding to the algorithm range. At step S612, the focus detection algorithm circuit determines whether a defocus amount with a high confidence level is obtained. If a defocus amount with a high level of confidence is obtained, the operation is completed and focus detection is possible. Alternatively, if the defocus amount does not have the desired level of confidence, the focus detection algorithm circuit moves to step S613 where the operation is completed, indicating that focus detection is impossible. These steps, S611 through S614, are operations of the focus detection algorithm circuit 4.

Figure 6:
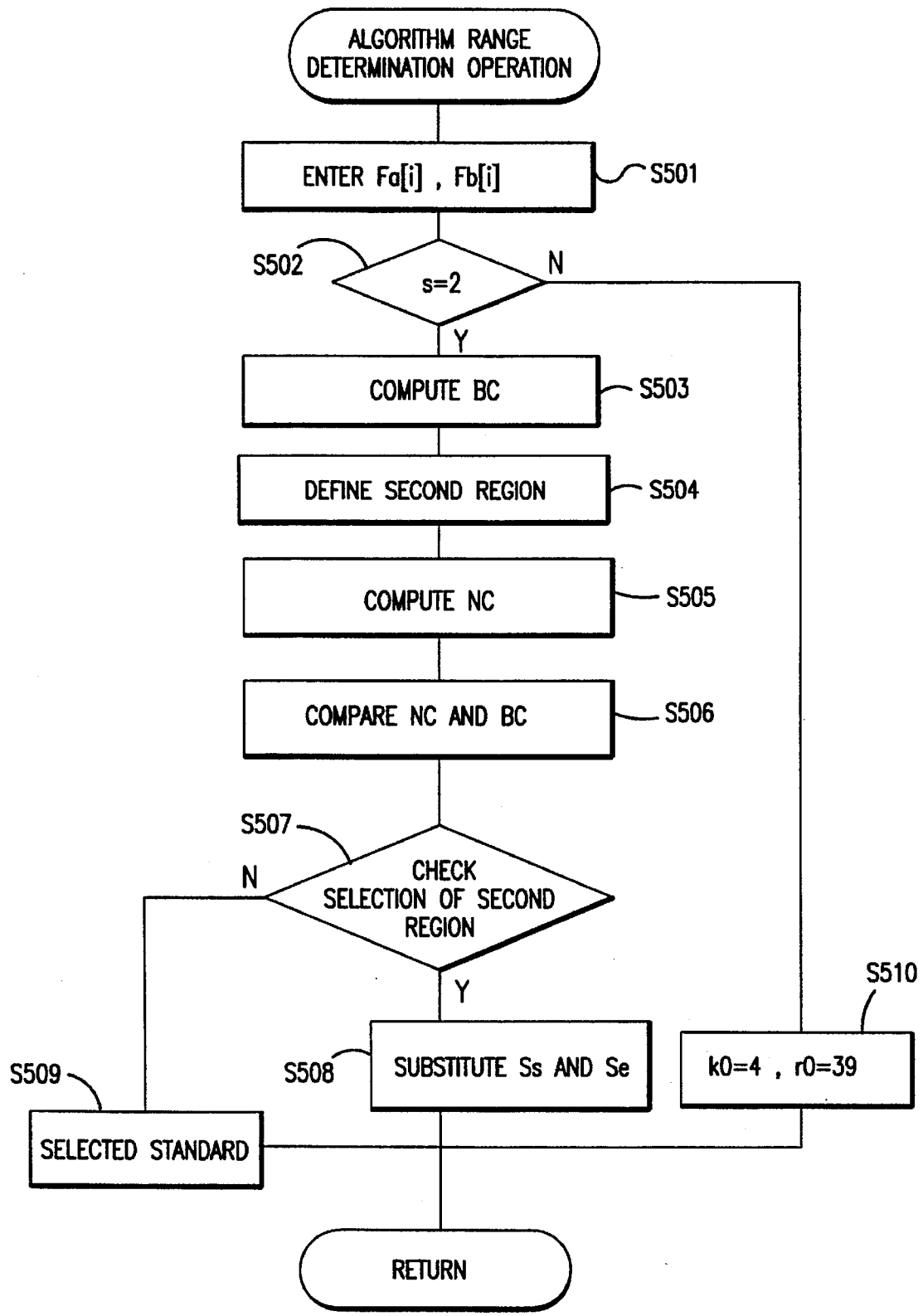
FIG. 6 is a flow chart illustrating the algorithm range determination method of the second embodiment.

The algorithm range determination operation in steps S605 and S610 in FIG. 5 will be explained in reference to FIG. 6.

At step S501, the filter processing data Fa[i] and Fb[i] are entered from the filter processing circuit 5, after which the algorithm range determination circuit moves to step S502 to check if the value of s in formulae 19 is 2. If s is not equal to 2, then it is equal to 4, in which case the wider algorithm range is preferred since the filter processing is intended to extract low frequency components. Thus, the algorithm range determination circuit moves to step S510 to establish the wider algorithm range. Alternatively, if s is equal to 2, the filter processing is intended to extract high frequency components, and the algorithm range determination circuit moves to step S503.

In executing filter processing to extract high frequency components, the contrast value BC in the wide standard region is computed at S503.

Here, the filter processing data Fa[i] of array A are used, and the standard region is to contain 36 photoelectric conversion elements from the central section of the photoelectric conversion elements, or 36 photoelectric conversion elements from the central section of the filter processing data. The contrast value BC in the standard region is obtained from formula 20.

$$BC = \Sigma |Fa[i] - Fa[i+t]|, \quad (20)$$

where $\Sigma$ denotes the total sum over i=6 to 41–t, and t is an integer, preferably from 1 to 4.

In this step, if the absolute value of the difference is smaller than or equal to the specified value, the absolute value of the difference should be replaced by 0 to eliminate the effects of noise.

At step S504, a portion of the standard region is defined as the second region. Establishment of the second region is based on the contrast distribution of the standard region, and the following two methods, for example, can be used.

In the first method, the center of the contrast distribution in the standard region is computed, and the region having a specified width around the location of the center Js is defined as the second region. The location of the center Js is obtained by the formula 21.

$$Js = \Sigma(|Fa[i] - Fa[i+t]| \times i) / \Sigma(|Fa[i] - Fa[i+t]|), \quad (21)$$

where $\Sigma$ denotes the total sum over i=6 to 41–t, and t is the same as in formula 20. Js is made into an integer by truncation or by rounding off.

Next, the second region is defined as width 12 data, for example, centered at Js. If t is 1, for example, the range from Js to Js+1 becomes the center of the second region, and the leading data number Ss and the last data number Se of the second region are determined by formulae 22.

$$Ss = Js - 5,$$

$$Se = Js + 6 \quad (22)$$

In the second method, a section Mc where the absolute value of the difference between adjacent data, or between data that are apart from each other by a specified data amount, becomes the maximum is detected. The second region is established as the region including the specified width from the maximum section Mc. The maximum section Mc is obtained by formula 23.

$$Mc = Max(|Fa[i] - Fa[i+t]|), \quad (23)$$

where Max denotes the largest value of |Fa[i]–Fa[i+t]| over i=6 to 41–t.

The second region is defined as width 12 data, for example, centering the maximum section Mc. If t is 1, for example, the range from Mc to Mc+1 becomes the center of the second region, and the leading data number Ss and the last data number Se of the second region are determined by formulae 24.

$$Ss = Mc - 5,$$

$$Se = Mc + 6 \quad (24)$$

At step S505, the contrast value NC of the second region extracted above will be computed from formula 25.

$$NC = \Sigma |Fa[i] - Fa[i+t]|, \quad (25)$$

where $\Sigma$ denotes the total sum over i=Ss to Se–t, and t is the same as in formula 20.

In this step, if the absolute value of the difference is smaller than or equal to the specified value, the absolute value of the difference should be replaced by 0 to eliminate the effects of noise.

At step S506, the contrast value BC for the standard region and the contrast value NC for the second region are compared, and one of the two regions will be determined as the focus detection algorithm range. If both values are almost equal to each other, the second region is established as the algorithm region, and if the difference between the two values is large, the standard region is established as the algorithm range. In particular, the second region is selected if the condition specified by formula 26 is satisfied; otherwise, the standard region is selected.

$$BC < Ks \times NC, \quad (26)$$

where $Ks$ is a real number, preferably between 1 and 2.

At step S507, selection of the second region is checked. If the second region is selected, the algorithm range determination circuit moves to S508, while it moves to step S509 if the standard region is selected. If the second region is selected, the second region is selected as the algorithm range at step S508, and the process is completed by substituting the following values for the first term k0 and the last term r0.

$$k0=Ss,$$
$$r0=Se. \quad (27)$$

Alternatively, if the standard region is selected, the standard region is selected as the algorithm range at step S509, and the process is completed by substituting the following values for the first term k0 and the last term r0.

$$k0=6,$$
$$r0=41. \quad (28)$$

At step S502, if s is determined to have a value other than 2 in formulae 19, the algorithm range determination circuit moves to step S510 after setting s=4, and the process is completed by selecting the specified wider range as the algorithm range, since the filtering process here is intended to extract low frequency components. That is, $$k0=4,$$
$$r0=39. \quad (29)$$

Incidentally, in the second embodiment above, two types of filtering processing are used corresponding to s=2 and s=4, but other types can be used with equal success.

Hereinafter, details of the determination of the focus detection algorithm range in the two embodiments described above will be presented with reference to examples of the subject pattern illustrated in FIGS. 7–10.

Figure 7:
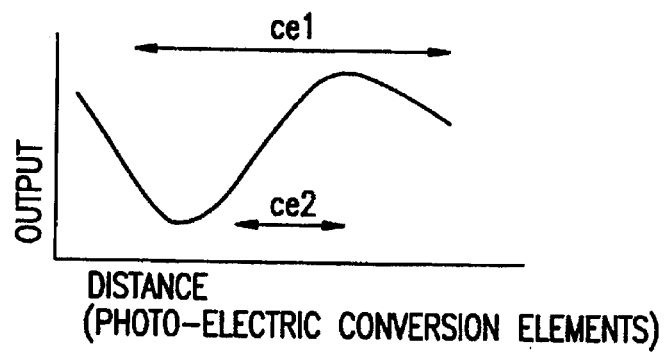
FIG. 7 is a drawing illustrating an example of a subject pattern consisting of only a low frequency component.

In the subject pattern illustrated in FIG. 7, the contrasts contained in the wide standard region ce1 are more extensive than the contrasts contained in the narrow second region ce2. Hence, the wide standard region ce1 is selected as the focus detection algorithm range. Moreover, in the subject pattern described in FIG. 8, the contrasts contained in the standard region are the same as the contrasts contained in the second region ce2. Hence, the second region is selected as the algorithm region. Furthermore, in the subject pattern described in FIG. 9, the contrasts contained in the wide region ce1 are more extensive than the contrasts contained in the second region ce2. Hence, the standard region ce1 is selected as the algorithm range for this pattern.

Figure 8:
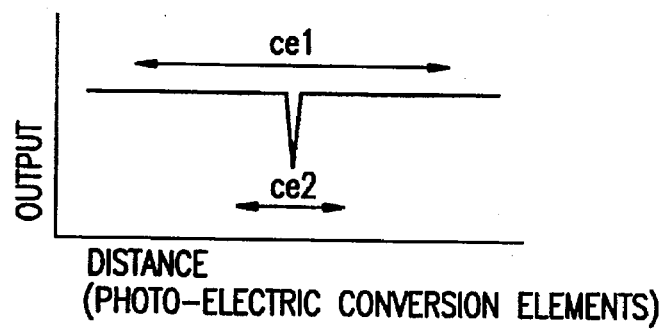
FIG. 8 is a drawing illustrating an example of a subject pattern consisting of a high frequency component and having contrast locally.
Figure 9:
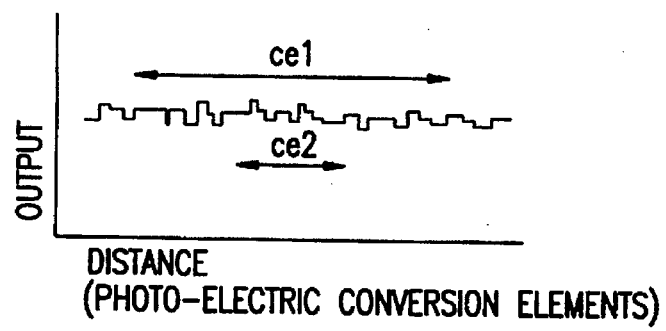
FIG. 9 is a drawing illustrating an example of a subject pattern consisting of a high frequency and having contrast in a wide area.
Figure 10:
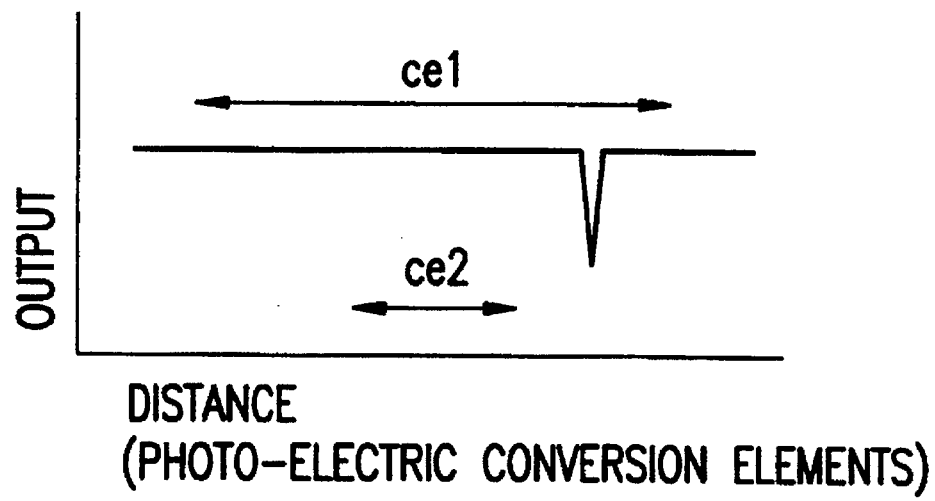
FIG. 10 is a drawing illustrating an example of a subject pattern consisting of a high frequency component and having contrast locally.
Figure 11:
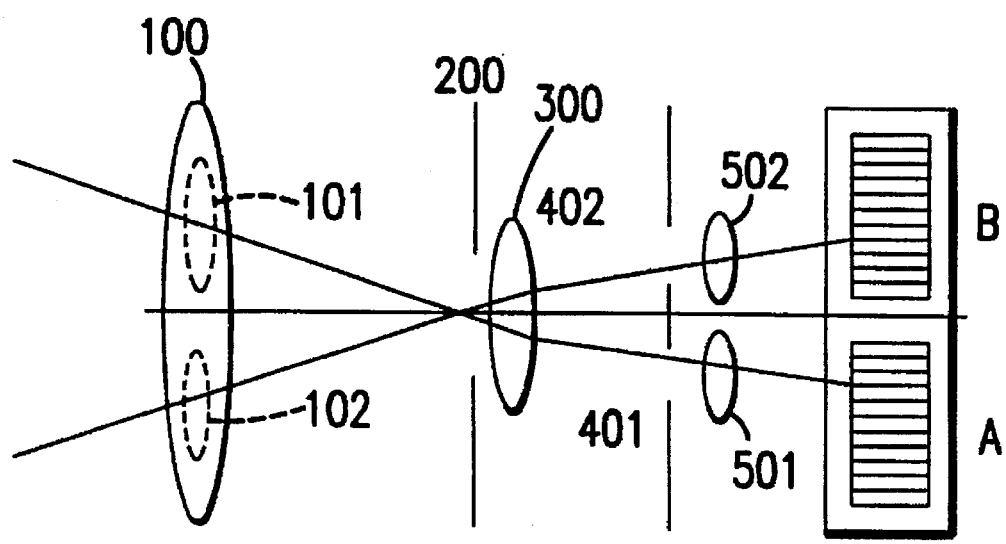
FIG. 11 is a drawing illustrating a conventional focus detection principle.
Figure 12:
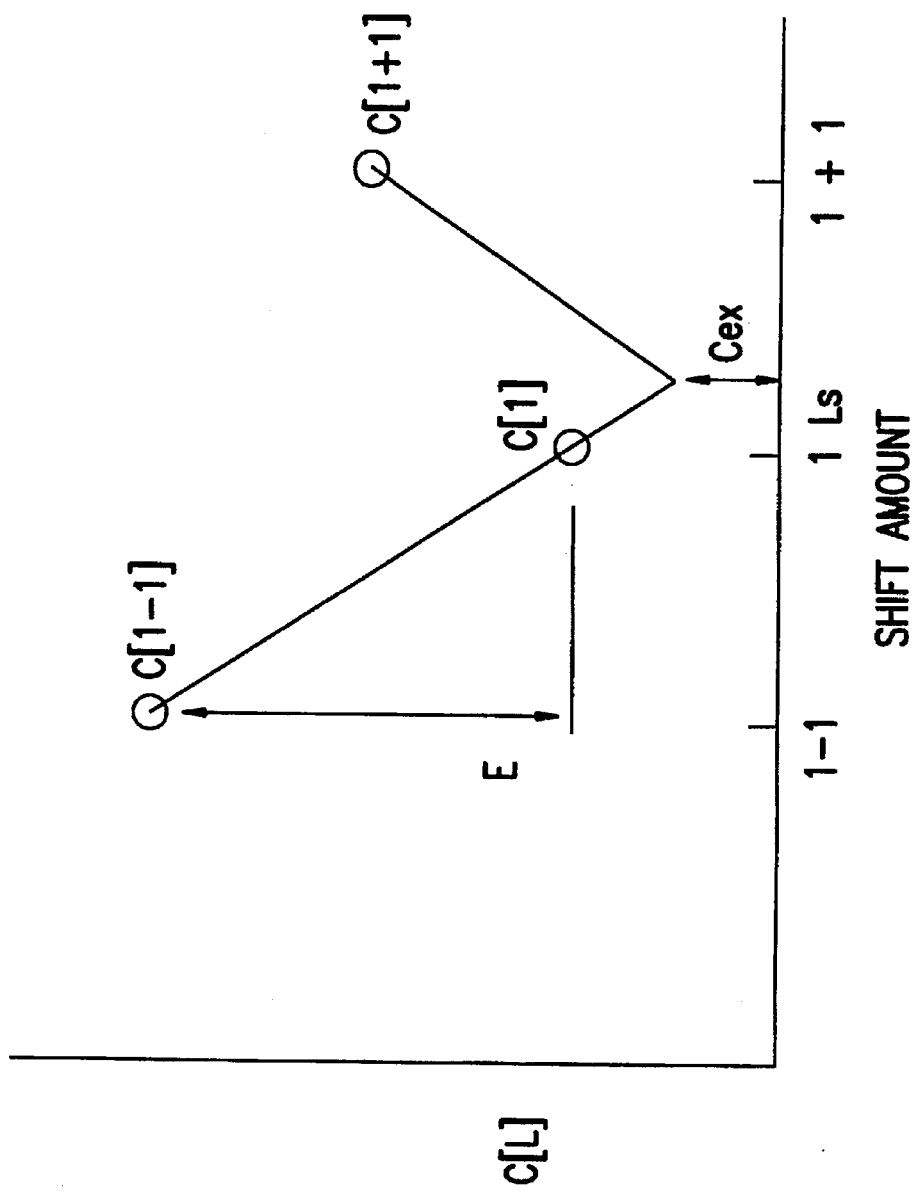
FIG. 12 is a drawing illustrating a conventional focus detection algorithm.
Figure 13A:
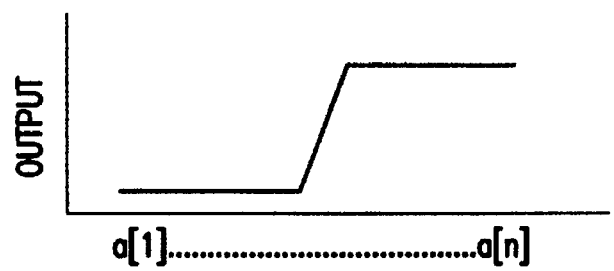
FIG. 13 is a drawing illustrating a conventional focus detection algorithm.
Figure 13B:
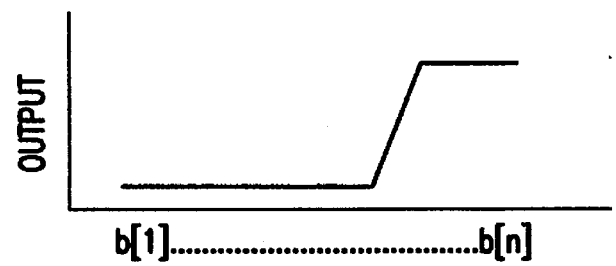
Figure 13C:
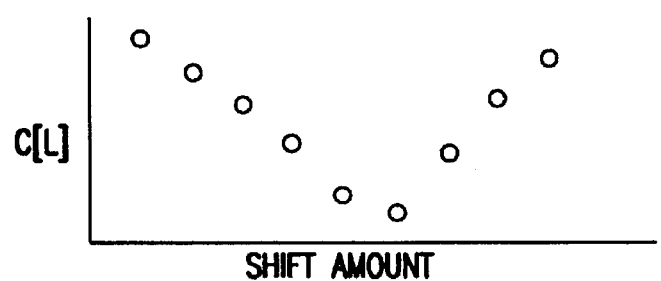
Figure 14:
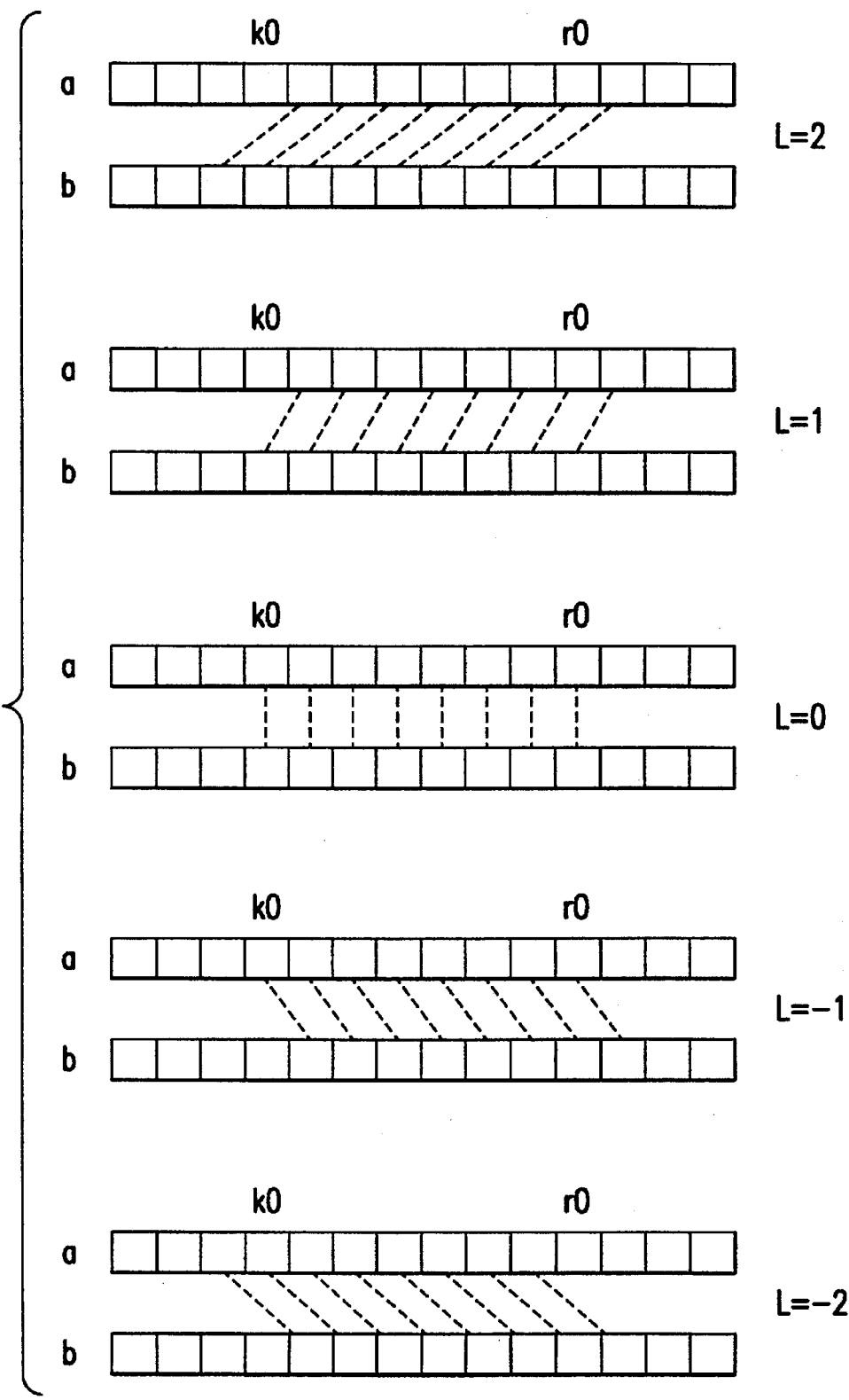
FIG. 14 is a drawing illustrating a conventional correlation algorithm.
Figure 15:
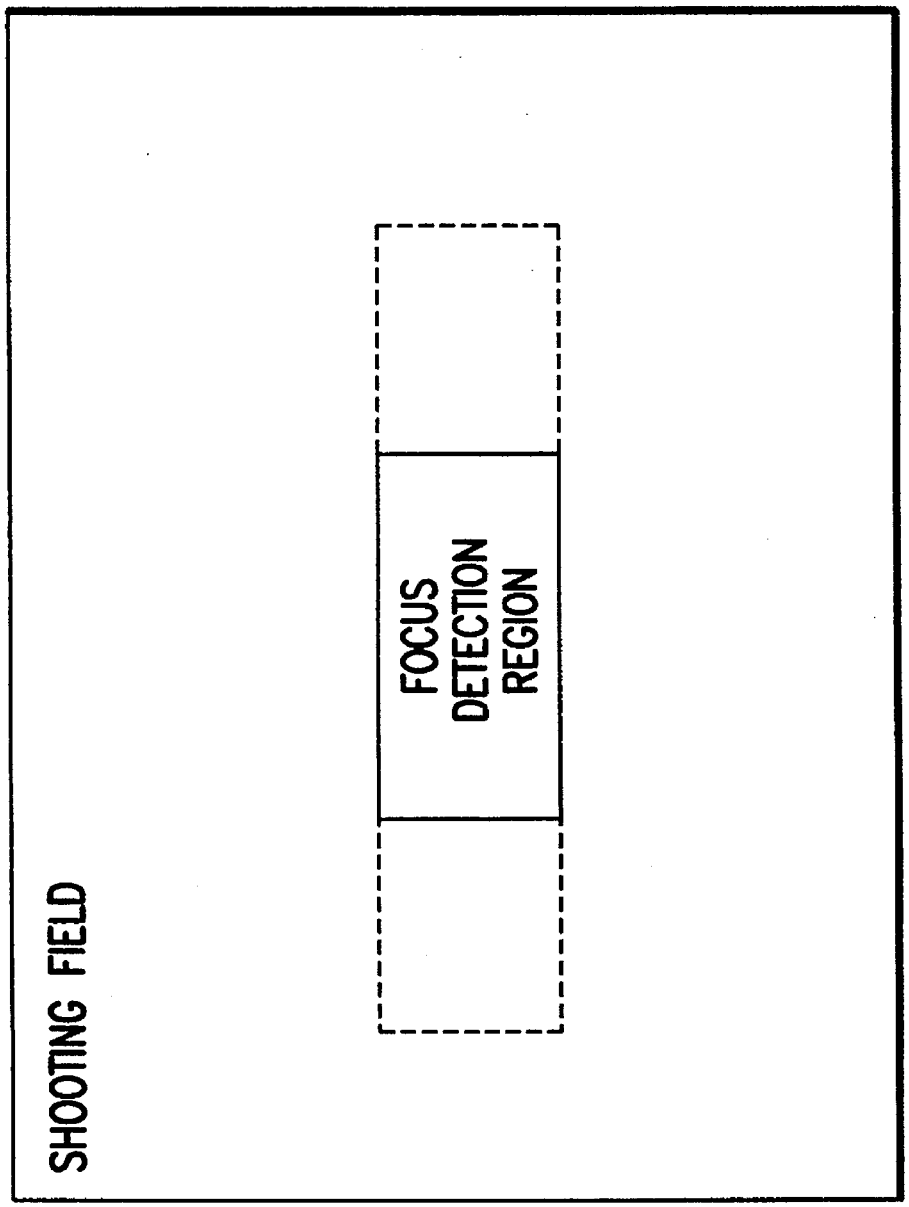
FIG. 15 is a drawing showing the positional relationship between a conventional shooting field and a focus detection area.

Here, as the narrow second region ce2 is established based on the contrast distribution of the wide standard region ce1, it is impossible to establish a second region in which there is no contrast, as illustrated in FIG. 10, and only regions having contrasts as illustrated in FIG. 8 are established as the second region.

In the structures of the embodiments described above, the image sensor 2 includes the photoelectric conversion arrays, the algorithm range determination circuit 3 includes the first computation means and the second computation means, the filter processing circuit 5 includes the filter processing means, and the focus detection algorithm circuit 4 includes the focus detection algorithm means, respectively.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the scope of the invention as defined in the following claims.

What is claimed is:

1. A focus state detection device for a camera having a shooting lens, said focus state detection device comprising:

at least one photoelectric conversion element array, each said at least one array having a plurality of photoelectric conversion elements that output strings of signals according to a light intensity distribution of a subject image;

a focus state detection optical system that composes the subject image on each said at least one photoelectric conversion element array by guiding light from a subject to each said at least one photoelectric conversion element array;

an algorithm range determination device comprising, a first computation device that establishes a first region on each said at least one photoelectric conversion element array and computes a first contrast value of the subject image in said first region based on the output signal strings from said plurality of photoelectric conversion elements contained in the first region, a region establishment device that computes a location of a center of a contrast distribution of said first region and establishes a second region having a specified width around the center of said contrast distribution, a second computation device that computes a second contrast value of the subject image in the second region based on the output signal strings from the plurality of photoelectric conversion elements contained in the second region, and an algorithm range selection device that selects one of the first region and the second region for a focus state detection algorithm range based on the first contrast value and the second contrast value; and a focus detection computing device that computes a focus adjustment condition of the shooting lens based on the output signal strings from the photoelectric conversion elements in the selected region.

2. The focus state detection device according to claim 1, wherein said algorithm range determination device compares the first contrast value and the second contrast value and determines said second region as the algorithm range if the difference between the two contrasts is smaller than or equal to a specified value and determines said first region as the algorithm range if the difference between the two contrasts is larger than the specified value.

3. The focus state detection device according to claim 1, further comprising a filter processing device that receives the signal strings from said photoelectric conversion elements and outputs filter processing signal strings to said first and second computation devices, wherein said first and second regions are determined based on said filter processing signal strings that are based on the signal strings from the photoelectric conversion elements in said first and second regions, respectively.

4. The focus state detection device according to claim 3, wherein said algorithm range determination device compares the contrast value of said first region and the contrast value of said second region and determines said second region as the algorithm range if a difference between the two contrast values is smaller than or equal to a specified value and determines said first region as the algorithm range if the difference between the two contrast values is larger than the specified value.

5. A focus state detection device for a camera having a shooting lens, said focus state detection device comprising:

at least one photoelectric conversion element array having a plurality of photoelectric conversion elements that output strings of signals according to a light intensity distribution of a subject image;

a focus state detection optical system that composes a subject image on each said at least one photoelectric conversion element array by guiding light from a subject to said at least one photoelectric conversion element array;

first computation means for establishing a first region on each said at least one photoelectric conversion element array and for computing a first contrast value of the subject image in said first region based on the output signal strings from said plurality of photoelectric conversion elements contained in the first region;

region establishment means for computing a location of a center of a contrast distribution of said first region and for establishing a second region having a specified width around the center of said contrast distribution;

second computation means for computing a second contrast value of the subject image in the second region based on the output signal strings from the plurality of photoelectric conversion elements contained in the second region;

algorithm range selection means for selecting one of the first region and the second region for a focus state detection algorithm range based on the first contrast value and the second contrast value; and focus detection computing means for computing a focus adjustment condition of the shooting lens based on the output signal strings from the selected region.

6. The focus state detection device according to claim 5, wherein said algorithm range determination means compares the first contrast value and the second contrast value and determines said second region as the algorithm range if a difference between the two contrasts is smaller than or equal to a specified value and determines said first region as the algorithm range if the difference between the two contrasts is larger than the specified value.

7. The focus state detection device according to claim 5, further comprising a filter processing means that receives the signal strings from said photoelectric conversion elements and outputs filter processing signal strings to said first and second computation means, wherein said first and second regions are determined based on said filter processing signal strings that are based on the signal strings from the photoelectric conversion elements in said first and second regions, respectively.

8. The focus state detection device according to claim 7, wherein said algorithm range determination means compares the contrast value of said first region and the contrast value of said second region and determines said second region as algorithm range if a difference between the two contrasts is smaller than or equal to a specified value and determines said first region as the algorithm range if the difference between the two contrasts is larger than the specified value.

9. A focus state detection method comprising the steps of:

guiding light rays through a shooting lens to at least one photoelectric conversion element array having a plurality of elements;

composing a subject image on each of said at least one photoelectric conversion element arrays;

outputting signal strings corresponding to a light intensity distribution of a subject image from the elements of said at least one photoelectric conversion element array;

establishing a first region on said photoelectric conversion element array;

computing a first contrast value of the subject image in said first region based upon the signal strings from said elements in said first region;

computing a location of a center of a contrast distribution of said first region;

establishing a portion of the first region as a second region having a specified width around the center of said contrast distribution;

computing a second contrast value of the subject in the second region based on the output signal strings from said elements in said second region;

selecting, based on said contrast values, one of the first region and the second region for a focus state detection algorithm range; and computing a focus adjustment condition of the shooting lens based on the signal strings from said selected region.

10. The focus state detection method according to claim 9, further comprising comparing the first contrast value and the second contrast value and determining said second region as the algorithm range if a difference between the two contrast is smaller than or equal to a specified value, and determining said first region as the algorithm range if the difference between the two contrasts is larger than the specified value.

11. The focus state detection method according to claim 9, further comprising the step of filter processing the signal strings from said photoelectric conversion elements and outputting filter processing signal strings so that the computing steps determine said first and second regions based on said filter processing signal strings that are based on the signal strings from the photoelectric conversion elements in said first and second regions, respectively.

12. The focus state detection method according to claim 11, wherein said step of determining a range comprises comparing the first contrast value and the second contrast value and determining said second region as the algorithm range of a difference between the two contrasts is smaller than or equal to a specified value and determining said first region as the algorithm range if the difference between the two contrast values is larger than the specified value.

13. A focus state detection device for a camera having a shooting lens, said focus state detection device comprising:

at least one photoelectric conversion element array, each said at least one array having a plurality of photoelectric conversion elements that output strings of signals according to a light intensity distribution of a subject image;

a focus state detection optical system that composes the subject image on each said at least one photoelectric conversion element array by guiding light from a subject to each said at least one photoelectric conversion element array;

an algorithm range determination device comprising, a first computation device that establishes a first region on each said at least one photoelectric conversion element array and computes a first contrast value of the subject image in said first region based on the output signal strings from said plurality of photoelectric conversion elements contained in the first region, a region establishment device that computes a location where an absolute value of a difference between signals having a specified distance from each other within the output signal strings corresponding to said first region becomes a maximum and establishes a second region having a specified width around the location where the absolute value becomes maximum, a second computation device that computes a second contrast value of the subject image in the second region based on the output signal strings from the plurality of photoelectric conversion elements contained in the second region, and an algorithm range selection device that selects one of the first region and the second region for a focus state detection algorithm range based on the first contrast value and the second contrast value; and a focus detection computing device that computes a focus adjustment condition of the shooting lens based on the output signal strings from the photoelectric conversion elements in the selected region.

14. A focus state detection device for a camera having a shooting lens, said focus state detection device comprising:

at least one photoelectric conversion element array having a plurality of photoelectric conversion elements that output strings of signals according to a light intensity distribution of a subject image;

a focus state detection optical system that composes a subject image on each said at least one photoelectric conversion element array by guiding light from a subject to said at least one photoelectric conversion element array;

first computation means for establishing a first region on each said at least one photoelectric conversion element array and for computing a first contrast value of the subject image in said first region based on the output signal strings from said plurality of photoelectric conversion elements contained in the first region;

region establishment means for computing a location where an absolute value of a difference between signals having a specified distance from each other within the output signal strings corresponding to said first region becomes a maximum and for establishing a portion of said first region as a second region, said second region having a specified width around the location where the absolute value becomes a maximum;

second computation means for computing a second contrast value of the subject image in the second region based on the output signal strings from the plurality of photoelectric conversion elements contained in the second region;

algorithm range selection means for selecting one of the first region and the second region for a focus state detection algorithm range based on the first contrast value and the second contrast value; and focus detection computing means for computing a focus adjustment condition of the shooting lens based on the output signal strings from the selected region.

15. A focus state detection method, comprising the steps of:

guiding light rays through a shooting lens to at least one photoelectric conversion element array having a plurality of elements;

composing a subject image on each of said at least one photoelectric conversion element arrays;

outputting signal strings corresponding to a light intensity distribution of a subject image from the elements of said at least one photoelectric conversion element array;

establishing a first region on said photoelectric conversion element array;

computing a first contrast value of the subject image in said first region based upon the signal strings from said elements in said first region;

computing a location where an absolute value of a difference between signals having a specified distance from each other within the output signal strings corresponding to said first region becomes maximum;

establishing a portion of the first region as a second region having a specified width around the location where the absolute value becomes the maximum;

computing a second contrast value of the subject in the second region based on the output signal strings from said elements in said second region;

selecting, based on said contrast values, one of the first region and the second region for a focus state detection algorithm range; and computing a focus adjustment condition of the shooting lens based on the signal strings from said selected region.

* * * * *